Feb. 9, 1960     J. E. BYRD, SR     2,924,117
SPEED LIMITING ACCELERATOR PEDAL

Filed June 12, 1959

INVENTOR.
JERRY E. BYRD, SR.
BY
McMorrow, Berman & Davidson
ATTORNEYS.

United States Patent Office 2,924,117
Patented Feb. 9, 1960

2,924,117

SPEED LIMITING ACCELERATOR PEDAL

Jerry E. Byrd, Sr., Haverford, Pa.

Application June 12, 1959, Serial No. 819,989

4 Claims. (Cl. 74—526)

The present invention relates to automotive vehicles generally and in particular to a speed limiting accelerator pedal for an automotive vehicle.

Previously proposed and presently in use are speed limiting devices for automotive vehicles which are intended to enable an operator of the vehicle to set a predetermined speed at which he wishes to operate the vehicle. Few of the devices which have been proposed or are in use are satisfactory for many reasons. A main reason for the failure of such devices to become generally acceptable is that occasionally an operator of a vehicle in which a speed limiting device is installed has need for overriding the speed device in order to negotiate travel upwardly on a sloping road surface or to pass a slower moving vehicle. The provision of the overriding feature to a speed limiting device generally necessitates alteration of the engine throttle controls and the addition to the ordinary accelerator of complicated and relatively expensive mechanisms.

An object of the present invention is to provide a speed limiting accelerator pedal for an automotive vehicle which is simple in structure and adaptable for use with any automotive vehicle having an accelerator control push rod extending through the floor of the vehicle.

Another object of the present invention is to provide a speed limiting accelerator pedal for installation in an automotive vehicle which requires no alteration of the accelerator control mechanism other than the substitution of the pedal for the conventional pedal.

A further object of the present invention is to provide a speed limiting accelerator pedal for an automotive vehicle which has means for overriding the preselected speed limit when the operator finds it necessary to exceed the predetermined speed, the overriding feature of the pedal requiring no more than the shifting of the operator's foot in a natural movement.

A still further object of the present invention is to provide a speed limiting accelerator pedal for an automotive vehicle which is efficient in operation, one readily attached to and detached from the floor of a vehicle, and one which is economically feasible.

These and other objects and advantages of the present invention will be fully apparent from the following description when taken in conjunction with the annexed drawing, in which.

Figure 1:
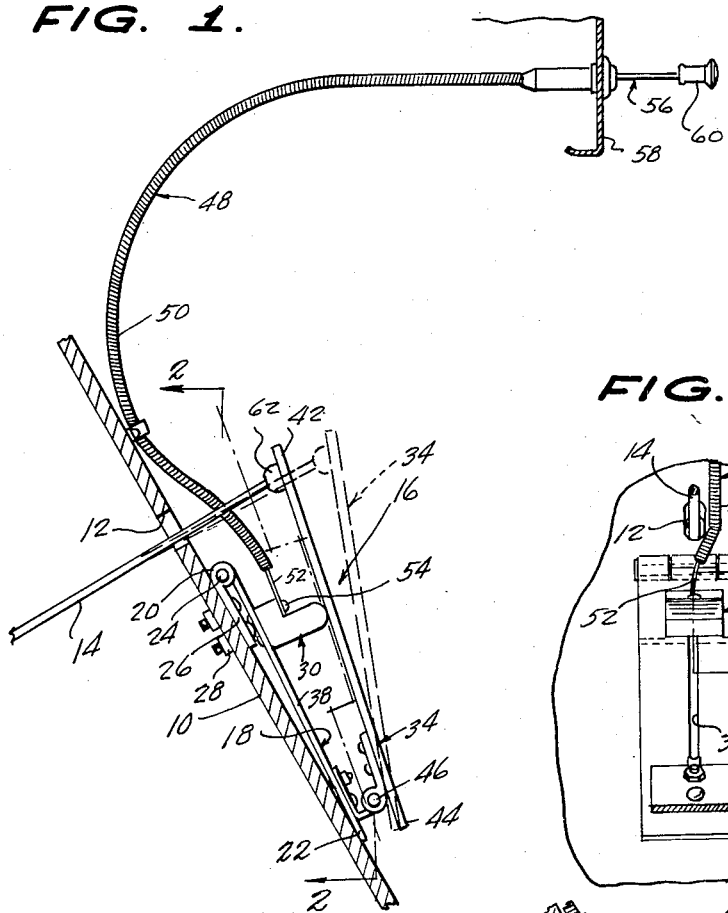
Figure 1 is an elevational view of the accelerator pedal of the present invention shown installed upon the floor of an automotive vehicle, the floor being shown in section, with the means for adjusting the pedal to a predetermined speed shown installed in the dashboard of the vehicle.
Figure 2:
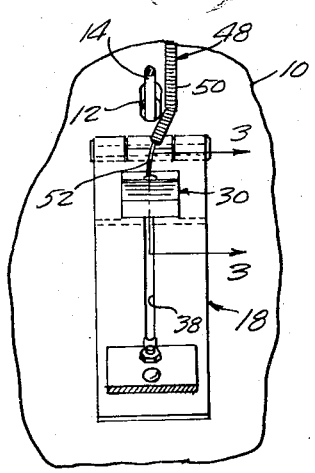
Figure 2 is a view taken on the line 2—2 of Figure 1.

Referring in greater detail to the drawing in which like numerals indicate like parts throughout the several views, the reference numeral 10 designates the floor of an automotive vehicle having an opening 12 therein through which projects an accelerator push rod 14 operatively connected to the throttle of the engine of the vehicle for increasing the speed of the vehicle upon downward movement of the rod 14 through the opening 12.

The device of the present invention is designated generally by the reference numeral 16 and comprises a support 18 having a forward end 20 and a rearward end 22. The support 18 is positioned longitudinally of the vehicle with the forward end 20 adjacent to and spaced rearwardly of the floor opening 12 and with the rearward end 22 remote from the opening 12.

The rearward end 22 of the support 18 is normally in contacting engagement with the floor 10. The support 18 is hingedly connected at its forward end 20 by a hinge pin 24 to a plate 26 secured by bolt and nut assemblies 28 to the floor 10.

Figure 4:
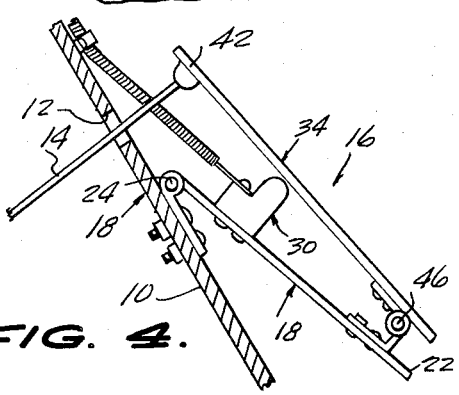
Figure 4 is a fragmentary view similar to Figure 1, showing the pedal in position overriding the predetermined speed limit.

The pin 24, plate 26, and the nut and bolt assemblies 28, constitute means connecting the forward end 20 of the support 18 to the floor 10 for swinging movement of the support 18 from the position contacting the floor, shown in full lines in Figure 1, to a position in which the portion adjacent the rearward end 22 is swung outwardly and out of contacting engagement with the floor 10, as shown in Figure 4.

Figure 3:
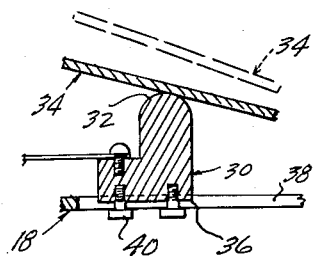
Figure 3 is a view taken on the line 3—3 of Figure 2.

A stop element 30 is positioned on the support 18 inwardly of and adjacent the forward end 20 and is connected to the support 18 for movement toward and away from the rearward end 22. The stop element 30 is shown most clearly in Figure 3 and is seen to have a rounded upper end portion 32 engaged by a pedal 34. The lower end of the stop element 30 projects, as at 36, into a slot 38 provided in the support 18. Cap screws 40 secure the stop element 30 in the slot 38 for movement toward and away from the rearward end 22 of the support 18.

The pedal 34 has a forward end 42 forwardly of the forward end 20 of the support 18 and in overlying relation with respect to the opening 12 in the floor 10. The rearward end 44 of the pedal 34 is complementally arranged with respect to the rearward end 22 of the support 18. A hinge pin 46 connects the rearward end 44 of the pedal 34 to the rearward end 22 of the support 18 for movement from the full line position in Figure 1 in which the pedal 34 is superimposed upon and spaced from the support 18 toward and away from the support 18, the away position being shown in dotted lines in Figure 1.

Hand actuable means is provided operatively connected to the stop element 30 for shifting the stop element 30 toward and away from the support rearward end 22. This means consists in a flexible cable assembly 48 having an outer sheath 50 and an inner core 52 which has one end secured by a screw element 54 to the stop element 30 on the side thereof adjacent the forward end of the support 18. The other end of the core 52 is connected to a control knob mechanism 56 anchored in the dashboard 58 of the vehicle in which the device of the present invention is installed. Upon pushing or pulling of the handle 60 of the mechanism 56, the stop element 30 moves toward and away from the rearward end 22 of the support 18.

Means is provided connecting the forward end 42 of the pedal 34 to the rod 14 for reciprocating movement of the rod 14 through the floor opening 12. This means consists in a socket member 62 formed on the underside of the pedal forward end 42 and receiving an appropriately shaped end formation (not shown) on the adjacent end of the rod 14. This construction is conventional and need not be further described for reasons of simplicity.

In operation, the operator of the automotive vehicle in which the device of the present invention is installed may select the speed of which the vehicle is to be driven and may position the stop element 30 forwardly or rearwardly of the rearward end 22 of the support 18 by shifting the knob 60 toward and away from the dashboard 58. Upon the application of a depressing force to the pedal 34 by the operator of the vehicle, the forward end 42 of the pedal 34 moves downwardly and causes the pedal 34 to have a midportion thereof abut against the free end of the stop element 30, limiting the movement downwardly of the pedal 34. This effects movement of the rod 14 through the opening 12 to accelerate the vehicle.

When it is desired to override the device and to cause the vehicle to travel at a speed greater than the preselected speed, the application of a depressive force to the forward end portion of the pedal 34 effects the tilting of the support 18 about the pin 24 as a first horizontal axis, as shown in Figure 4, so that the rearward end of the support 18, stop element 30 and pedal 18 move as a unit away from the floor 10 to effect further downward movement of the rod 14 through the opening 12. The pin 46 constitutes a second horizontal axis about which the pedal 34 moves in a swinging movement upon the application of a depressive force thereto.

It will be seen therefore that the pedal or device of the present invention may be easily and readily installed upon the floor of a vehicle with little or no alteration thereto and with only the mounting of the mechanism 56 in the dash 58 as an alteration to the vehicle structure.

What is claimed is:

1. For use with an automotive vehicle having a floor and an accelerator push rod projecting through an opening in the floor and operatively connected to the engine of the vehicle for increasing the speed of the vehicle upon downward movement of the rod through the opening, a speedometer control device comprising a support having a forward end and a rearward end arranged so that the forward end is adjacent to and spaced from said floor opening with the rearward end of said support remote from said opening and normally in contacting engagement with said floor, means connecting the forward end of said support to said floor for swinging movement of said support from the contacting engagement position to a position in which the portion adjacent the rearward end is out of contacting engagement with said floor, a pedal having a forward end and a rearward end superimposed upon and spaced from said support with the forward end forwardly of the forward end of said support and overlying the floor opening and with the rearward end complemental to the rearward end of said support, means connecting the rearward end of said pedal to the rearward end of said support for swinging movement of said pedal toward and away from said support, means operatively connected to said support for limiting movement of said pedal toward said support, and means connecting the forward end of said pedal to said rod for reciprocating movement of said rod through said opening, said pedal upon the application of a depressing force thereto moving downwardly and effecting movement of said rod through said floor opening and upon further application of the depressing force to the forward end of said pedal moving the portion of said support adjacent the rearward end and said pedal as a unit away from the floor to effect further movement of said rod through said floor opening.

2. For use with an automotive vehicle having a floor and an accelerator push rod projecting through an opening in the floor and operatively connected to the engine of the vehicle for increasing the speed of the vehicle upon downward movement of the rod through the opening, a speed control device comprising a support having a forward end and a rearward end arranged so that the forward end is adjacent to and spaced from said floor opening with the rearward end of said support remote from said opening and normally in contacting engagement with said floor, means connecting the forward end of said support to said floor for swinging movement of said support from the contacting engagement position to a position in which the portion adjacent the rearward end is out of contacting engagement with said floor, a stop element positioned on said support inwardly of and adjacent the forward end and connected to said support for movement toward and away from the rearward end thereof, a pedal having a forward end and a rearward end superimposed upon and spaced from said support with the forward end forwardly of the forward end of said support and overlying the floor opening and with the rearward end complemental to the rearward end of said support, means connecting the rearward end of said pedal to the rearward end of said support for swinging movement of said pedal toward and away from said support, said stop element being engageable with said pedal upon application of a depressing force to said pedal for limiting movement of said pedal toward said support, and means connecting the forward end of said pedal to said rod for reciprocating movement of said rod through said opening, said pedal upon the application of a depressing force thereto moving downwardly and abutting against said stop element to effect movement of said rod through said floor opening and upon further application of the depressing force to the forward end of said pedal moving the portion of said support adjacent the rearward end, said stop element, and said pedal as a unit away from the floor to effect further movement of said rod through said floor opening.

3. For use with an automotive vehicle having a floor and an accelerator push rod projecting through an opening in the floor and operatively connected to the engine of the vehicle for increasing the speed of the vehicle upon downward movement of the rod through the opening, a speed control device comprising a support having a forward end and a rearward end arranged so that the forward end is adjacent to and spaced from said floor opening with the rearward end of said support remote from said opening and normally in contacting engagement with said floor, means connecting the forward end of said support to said floor for swinging movement of said support from the contacting engagement position to a position in which the portion adjacent the rearward end is out of contacting engagement with said floor, a stop element positioned on said support inwardly of and adjacent the forward end and connected to said support for movement toward and away from the rearward end thereof, a pedal having a forward end and a rearward end superimposed upon and spaced from said support with the forward end forwardly of the forward end of said support and overlying the floor opening and with the rearward end complemental to the rearward end of said support, means connecting the rearward end of said pedal to the rearward end of said support for swinging movement of said pedal toward and away from said support, said stop element being engageable with said pedal upon application of a depressing force to said pedal for limiting movement of said pedal toward said support, means connecting the forward end of said pedal to said rod for reciprocating movement of said rod through said opening, said pedal upon the application of a depressing force thereto moving downwardly and abutting against said stop element to effect movement of said rod through said floor opening and upon further application of the depressing force to the forward end of said pedal moving the portion of said support adjacent the rearward end, said stop element, and said pedal as a unit away from the floor to effect further movement of said rod through said floor opening, and hand actuable means operatively connected to said stop element for shifting the latter toward and away from said support rearward end.

4. For use with an automotive vehicle having a floor and an accelerator push rod projecting through an opening in the floor and operatively connected to the engine of the vehicle for increasing the speed of the vehicle upon downward movement of the rod through the opening, a speed control device comprising a support having a forward end and a rearward end arranged so that the forward end is adjacent to and spaced from said floor opening with the rearward end of said support remote from said opening and normally in contacting engagement with said floor, means connecting the forward end of said support to said floor for swinging movement of said support about a first horizontal axis from the contacting engagement position to a position in which the portion adjacent the rearward end is out of contacting engagement with said floor, a stop element positioned on said support inwardly of and adjacent the forward end and connected to said support for movement toward and away from the rearward end thereof, a pedal having a forward end and a rearward end superimposed upon and spaced from said support with the forward end forwardly of the forward end of said support and overlying the floor opening and with the rearward end complemental to the rearward end of said support, means connecting the rearward end of said pedal to the rearward end of said support for swinging movement of said pedal about a second horizontal axis toward said support, means connecting the forward end of said pedal to said rod for reciprocating movement of said rod through said opening, said pedal upon the application of a depressing force thereto moving downwardly and abutting against said stop element to effect movement of said rod through said floor opening and upon further application of the depressing force to the forward end of said pedal moving the portion of said support adjacent the rearward end, said stop element, and said pedal as a unit away from the floor to effect further movement of said rod through said floor opening, and hand actuable means operatively connected to said stop element for shifting the latter toward and away from said support rearward end.

References Cited in the file of this patent

UNITED STATES PATENTS

| | | |
|---|---|---|
| 1,826,968 | Townsend et al. | Oct. 13, 1931 |
| 2,165,897 | Liley | July 11, 1939 |
| 2,803,971 | Turner | Aug. 27, 1957 |
| 2,878,683 | Huthsing et al. | Mar. 24, 1959 |